Patented May 23, 1950

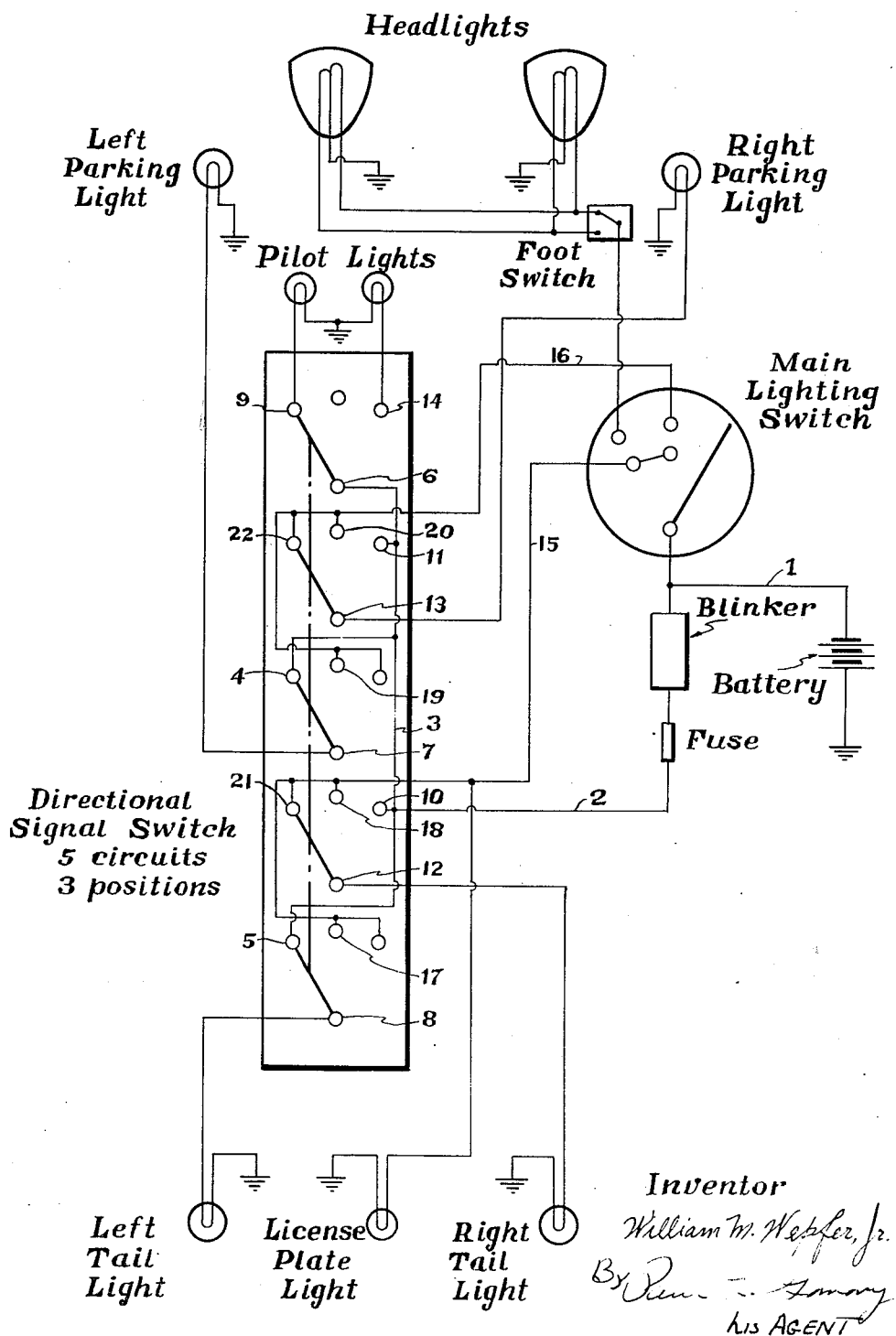

2,508,630

UNITED STATES PATENT OFFICE 2,508,630

DIRECTIONAL SIGNAL FOR AUTOMOBILES

William M. Wepfer, Jr., Jamaica, N. Y.

Application August 23, 1946, Serial No. 692,508

1 Claim. (Cl. 177—337)

This invention relates to the control of vehicle lighting circuits.

The object of this invention is to provide a control which can be interposed in standard lighting circuits of vehicles to produce, both night and day, signals announcing an impending departure from the instant vehicle course.

It will be evident from the description infra that the novelty and utility of this invention reside in the accomplishment of the object set forth through the agency of standard vehicular lighting circuits without interfering, in any way, with the normal uses thereof.

By way of example, in a conventional automobile lighting system comprising in its circuit dual parking and headlights fore, dual combination tail-stop lights and separate license illuminating means aft, the combination of adjacent parking and tail light filaments may be energized intermittently on either side of the vehicle, at will, when such filaments are not in normal use, or, when in normal, continuous service, caused to operate intermittently, thereby signalling, both fore and aft, an impending turn, either to the right or left. Thus, the requirement of separate, special signal light sources, or multifilament bulbs, or both, characterizing the prior art, is avoided.

Reference is had to the drawing wherein the conventional components of an automobile lighting system are illustrated diagrammatically and labelled. It will be understood that a stop light circuit and associated filaments are energized conventionally through a vehicle brake-actuated switch; for simplicity, that independent circuit is not shown.

Line 1, supplying battery current to the main lighting switch in the conventional circuit, is tapped to supply through a flasher labelled "blinker," a fuse, and lines 2 and 3, a directional signal switch having a plurality of elements, each of which comprises a switch arm and three contact points as for example at 11, 20 and 22. The several switch arms are linked mechanically to operate simultaneously, and operatively engage corresponding contact points such as 9, 22, 4, 21 and 5. It is to be understood that this directional signal switch either may be operated manually, at will, or linked operatively to the vehicle steering mechanism so as to provide automaticity.

In the illustration, a directional signal switch having five elements is shown in the position occupied when signal for a left turn is desired to be given. With the main lighting switch in off position, the following circuit is established: Battery through line 1, through "blinker" and fuse, through lines 2 and 3 to terminal 6, to contact points 4 and 5. From terminal 6 through switch arm and contact point 9, a pilot light is energized. From contact point 4 through switch arm and terminal 7, the left parking light is energized. From contact point 5 through switch arm and terminal 8, the left tail light is energized. The thus established circuit results, by virtue of the "blinker" in series, in an intermittent, flashing operation of the left tell-tale or pilot, parking and tail lights. With the main lighting switch in the first operative position, which, in a conventional lighting system, establishes direct connection of the source of energy to the parking and tail lights, the previously described circuit remains energized as before while a steady flow of current is supplied through the main lighting switch to the right parking light via line 16, contact point 22, switch arm and terminal 13; the license plate light is supplied via line 15; the right tail light is supplied via line 15, contact point 21, switch arm and terminal 12. Again, with the main lighting switch in the second operative position, which, in a conventional lighting system, establishes direct connection of the source of energy to the headlights and tail lights, the intermittent supply of the circuit signalling left turn remains unaffected while the headlights receive a steady supply of current through the foot switch; the right parking light circuit is open; the right tail and license plate lights remain unaffected with respect to the previous position of the main lighting switch.

In signalling a right turn with the main lighting switch in off position, the following circuit is established: Battery through line 1, through "blinker" and fuse, through lines 2 and 3 to contact points 10 and 11 and terminal 6. From terminal 6 through switch arm and contact point 14, the corresponding pilot light is energized. From contact point 11 through switch arm and terminal 13, the right parking light is energized. From contact point 10 through switch arm and terminal 12, the right tail light is energized. With the main lighting switch in the first operative position, the previously described circuit remains energized intermittently while a steady flow of current is now supplied through the main lighting switch to the left parking light via line 16, switch arm and terminal 7; the left tail light is supplied through line 15, switch arm and terminal 8. The license plate light is supplied directly through line 15. With the main lighting switch in the second operative position, the circuit responsible for the right turn signal remains unaffected while the headlights are supplied through the foot switch, and the left parking light circuit, line 16—switch arm—terminal 7—to light, is open. The license plate light remains supplied directly through line 15.

With the interposed directional signal switch in neutral or off position, the conventional vehicle lighting system is supported as follows: With the main lighting switch in the first operative position, current is supplied steadily through line 16, contact point 20, switch arm and terminal 13 to the right parking light; through line 16, contact point 19, switch arm and terminal 7 to the left parking light; through line 15, contact point 18, switch arm and terminal 12 to the right tail light; through line 15, contact point 17, switch arm and terminal 8 to the left tail light. With the main lighting switch in the second operative position to provide headlighting, the coöperation of the interposed directional signal switch is achieved as before with respect to the tail lights while the parking light circuit obviously is open at the main lighting switch.

I claim:

For a vehicle lighting circuit comprising a source of energy, a two-position main lighting switch, left and right single filament parking lights, left and right single filament tail lights and a separate rear license plate light: a switch to control said circuit to energize intermittently, at will, when normally unenergized, and to render intermittent the energization when normally energized of one of the combinations of the left parking and tail light filaments and the right parking and tail light filaments, to signal an impending turn to the left or right, and to support the continuous energization of said vehicle lighting circuit when energized through the main lighting switch; consisting of five like elements; each element having a central terminal supporting pivotally thereon a switch arm, and three additional terminals disposed arcuately about the said central terminal so as to enable, selectively and successively, operative connection between said central terminal and the left, middle, and right of said three arcuately disposed terminals by way of the said switch arm; mechanical linkage means for causing simultaneous and parallel actuation of the switch arm on each of said elements; a first conductor interconnecting the central terminal of the first element, the right terminal of the second element, the left terminal of the third element, the right terminal of the fourth element and the left terminal of the fifth element; a second conductor interconnecting the middle and left terminals of the second element and the middle and right terminals of the third element; a third conductor interconnecting the middle and left terminals of the fourth element and the middle and right terminals of the fifth element; means on said switch for connecting to the first recited conductor through a fuse and flasher in series relation the source of energy; means on said switch for connecting to the secondly recited conductor a parking and tail light energizing terminal on the main lighting switch; means on said switch for connecting to the thirdly recited conductor the energy from the source in either of two operative positions of the main lighting switch and the license plate filament; means on said switch for connecting to the central terminal of the second element the right parking light filament; means on said switch for connecting to the central terminal of the third element the left parking light filament; means on said switch for connecting to the central terminal of the fourth element the right tail light filament; means on said switch for connecting to the central terminal of the fifth element the left tail light filament; and means on said switch for connecting to each of the left and right terminals of the first element the filament of a pilot light.

WILLIAM M. WEPFER, Jr.

REFERENCES CITED

The following references are of record in the file of this patent:

UNITED STATES PATENTS

| Number | Name | Date |
|---|---|---|
| 810,522 | Eastman | Jan. 23, 1906 |
| 1,749,168 | Swartwout | Mar. 4, 1930 |
| 2,086,859 | Rom | July 13, 1932 |
| 2,122,508 | Bell | July 5, 1938 |
| 2,238,394 | Murray | Apr. 15, 1941 |
| 2,300,896 | Hosmer | Nov. 3, 1942 |
| 2,321,803 | Falge et al. | June 15, 1943 |
| 2,411,013 | Warnke | Nov. 12, 1946 |